United States Patent
Overhues

[11] Patent Number: 5,547,326
[45] Date of Patent: Aug. 20, 1996

[54] SPRING WASHER FOR THE SECURING OF SCREWS, NUTS, OR THE LIKE

[75] Inventor: Egon Overhues, Neuenrade, Germany

[73] Assignee: Teckentrup GmbH & Co. KG, Herscheid, Germany

[21] Appl. No.: 394,078

[22] Filed: Feb. 24, 1995

[30] Foreign Application Priority Data

Feb. 25, 1994 [DE] Germany ............... 44 06 270.2

[51] Int. Cl.⁶ ............... F16B 39/24; F16B 43/02
[52] U.S. Cl. ............... 411/544; 411/156; 411/916
[58] Field of Search ............... 411/155, 156, 411/368, 544, 916, 917

[56] References Cited

U.S. PATENT DOCUMENTS

| | | | |
|---|---|---|---|
| 1,963,535 | 6/1934 | Trotter | 411/156 |
| 3,037,221 | 6/1962 | Lanius, Jr. . | |
| 3,332,464 | 7/1967 | Castel | 411/155 |
| 3,476,009 | 4/1969 | Markey . | |
| 3,628,584 | 12/1971 | Gutshall . | |
| 3,856,066 | 12/1974 | Reynolds | 411/155 |
| 4,302,136 | 11/1981 | Abe et al. | 411/156 X |
| 5,112,178 | 5/1992 | Overhues et al. | 411/544 |
| 5,188,441 | 2/1993 | Rugel | 411/156 X |

FOREIGN PATENT DOCUMENTS

| | | |
|---|---|---|
| 1001224 | 8/1989 | Belgium . |
| 0470433 | 2/1992 | European Pat. Off. . |
| 206129 | 6/1974 | Germany . |
| 3011488 | 10/1981 | Germany . |

*Primary Examiner*—Neill R. Wilson
*Attorney, Agent, or Firm*—Sughrue, Mion, Zinn, Macpeak & Seas

[57] ABSTRACT

A spring washer for the securing of screws, nuts and the like is provided with an essentially ring-shaped washer body of a determined thickness having a washer top side and a washer under side, the washer under side being subdivided into an outer ring surface and an inner ring surface. The washer in an unstressed state rests with the outer edge of the outer ring surface on a flat base and the outer ring surface and the inner ring surface forms an acute angle with this base. The washer under side (2) is subdivided by a circular groove (3) into the outer ring surface (4) and the inner ring surface (5) and the spring washer is shaped in such a way that the outer ring surface (4) is arched inwards and forms a smaller acute angel ($\alpha$) with the flat base (7) than the inner ring surface.

17 Claims, 1 Drawing Sheet

SPRING WASHER FOR THE SECURING OF SCREWS, NUTS, OR THE LIKE

BACKGROUND OF THE INVENTION

The invention relates to a spring washer for the securing of screws, nuts or the like with an essentially ring-shaped washer body of a certain thickness having a washer top side and a washer under side, wherein the washer under side is subdivided into an outer ring surface and an inner ring surface and the washer in an unstressed state rests with the outer edge of the outer ring surface on a flat base and the outer ring surface and the inner ring surface form an acute angle with this flat base.

Spring washers have the function to counteract loosening processes in screw connections. Loosening processes of this type result from initial stressing force losses in the screw connections which arise as a consequence of settling and/or creeping processes in the parts which are screwed together.

In order to avoid loosening processes, the spring washers must have a sufficient spring tension over a certain travel of the spring which can compensate an initial stressing force loss generated by the settling or creeping processes to the extent that the required clamping force for the operating reliability of the screw connection is maintained.

Various washer constructions have already been proposed for the attainment of a sufficient spring tension over a certain travel of the spring. The simplest washer construction of this type is represented by the tightening disk according to DIN 6796. In this known construction, the outer ring surface merges with equal thickness of the washer body directly into the inner ring surface without recognizable subdivision. For example, DE-AS 20 61 297 discloses a further construction of this type. In this construction the washer under side is subdivided by a step into the outer ring surface and the inner ring surface. Therefore, by tightening of the screw connection the outer ring surface is first pressed onto the base, whereby an initial spring tension with a certain spring travel results. Then by further tightening, the initiation of force follows over the relatively steep step, whereby a relatively high spring tension results for a very small spring excursion. However, by virtue of the lever effect of the step the danger exists that by a further tightening process the outer edge of the outer ring surface lifts up from the base such that finally the entire load lies only in the region of the step. Therefore, this region is also burdened the most. Thus, washer constructions of this type are only suitable for such securing tasks which may be exposed to high specific surface pressures in the region of the support under the step.

DE-OS 40 25 146 discloses a further washer construction. In this known construction, the outer ring surface uniformly merges, i.e. without a step or the like, into the inner ring surface. However, the transition region in this washer construction has a smaller cross-section than the remaining region of the washer body. This smaller cross-section in the transition region is achieved by a circular groove arranged on the washer top side. By virtue of this circular groove on the washer top side, washer constructions of this type have the tendency to "gape", i.e. the tendency to lift up in the region of the outer edge of the outer ring surface, especially at low thickness of the washer body and too great a starting torque.

The so-called "gaping" in washer constructions of this type can be reduced in its effect by forming the part of the washer body having the outer ring surface as a relatively large area. This means that washer constructions of this type produce their full securing effect, especially with a large outer diameter.

SUMMARY OF THE INVENTION

The object of the present invention is to further develop a spring washer of this type in such a way that it is inexpensively manufacturable in a simple manner with low material use and has good spring quality and unscrewing properties at constant friction values.

The object is solved according to the invention in that the washer under side is divided by a circular groove into the outer ring surface and the inner ring surface and the outer ring surface is arched inwards and forms a smaller acute angle with the flat base than the inner ring surface.

Through the combination of features according to the invention, a spring washer is created which, in a surprising manner, can be manufactured with reproducible properties in large quantities, possesses a relatively large spring travel, and produces a comparatively high spring tension. Furthermore, in the unstressed state, the washer still has a high residual elasticity which results in good securing properties. Furthermore, on account of the special shape the outer diameter can be kept relatively small.

Considering simple tightening disks according to DIN 6796, the following advantages result in comparison:

- At equal spring tension, the material quantity can be decreased by 40 to 50%,
- based on equal material quantity, a higher spring tension can be achieved by virtue of combination of features according to the invention,
- with an quantity of material and considerably higher spring tension, substantial increase in the active travel of the spring with simultaneous improvement in the reutilization results with less settling.

For attainment of the described properties it is sufficient that the inner ring surface is flat. For certain fields of application, it can however also be advantageous to arc the inner ring surface inwardly, i.e. concave.

As already mentioned, an essential feature of the combination of features according to the invention lies in that the outer ring surface forms a smaller acute angle with the flat base than the inner ring surface. Depending on the material, the size of the washer and the intended application, the acute angle can be selectively chosen. However, it is advantageous if the acute angle between the outer ring surface and the flat base is between 3° and 20°, preferably between 5° and 15°, in the unstressed state and the acute angle between the inner ring surface and the flat base is between 10° and 20°, preferably between 12° and 15°, in the unstressed state.

For special applications it can be advantageous to choose the acute angle between the inner ring surface and the flat base in the unstressed state to be about twice as large as the acute angle between the outer ring surface and the flat base.

Also, as already mentioned, a further essential feature of the combination of features according to the invention lies in that in contrast to known solutions, the groove is arranged on the washer under side. In principle, the groove can have any form. A form particularly advantageous for the manufacture and the operation of the groove constitutes an arcuate and/or semi-circular cross-section.

The relationship of the outer ring surface to the inner ring surface can, in principle, be chosen freely and be adjusted to the respectively intended application by testing. However, optimal relationships for a large part of the fields of application are then given when the ratio of the outer ring surface to the inner ring surface is equal to about 3:1.

To produce the described properties, it is sufficient for the groove to be arranged in the washer under side. For special applications, however, it can also be advantageous to arrange a groove of this type additionally on the washer top side. This groove on the washer top side can also possess an arcuate and/or a semi-circular cross-section.

For such a case dealing with a field of application in which the outer ring surface should or is allowed to dig into the base, it is advantageous to form the outer edge of the outer ring surface as a sharp edge.

To improve the securing effect, it can also be advantageous in certain applications to provide the washer top side with a profiling. This profiling can be limited to the inner ring region and, for example, be designed in the form of a knurl. This profiling can also be formed as a knurled head or cross-knurled head profiling or in another way.

To attain the described properties it is, in principle, sufficient that the washer top side is even. However, if required, the washer top side can also have a curvature. Particularly good results are obtained with a concave curve.

Particularly advantageous production is possible if not only the outer ring surface is arched inwards but that the entire washer body in the outer ring region is cambered to attain this arch.

For washer constructions in which the inner ring surface is also curved inwards, it can be advantageous for easier manufacture to camber the entire washer body, also in the inner ring region.

BRIEF DESCRIPTION OF THE DRAWINGS

For further explanation and better understanding, an exemplified embodiment of the invention is described and explained in more detail with reference to the attached drawing in which.

DETAILED DESCRIPTION OF THE INVENTION

Figure 1:
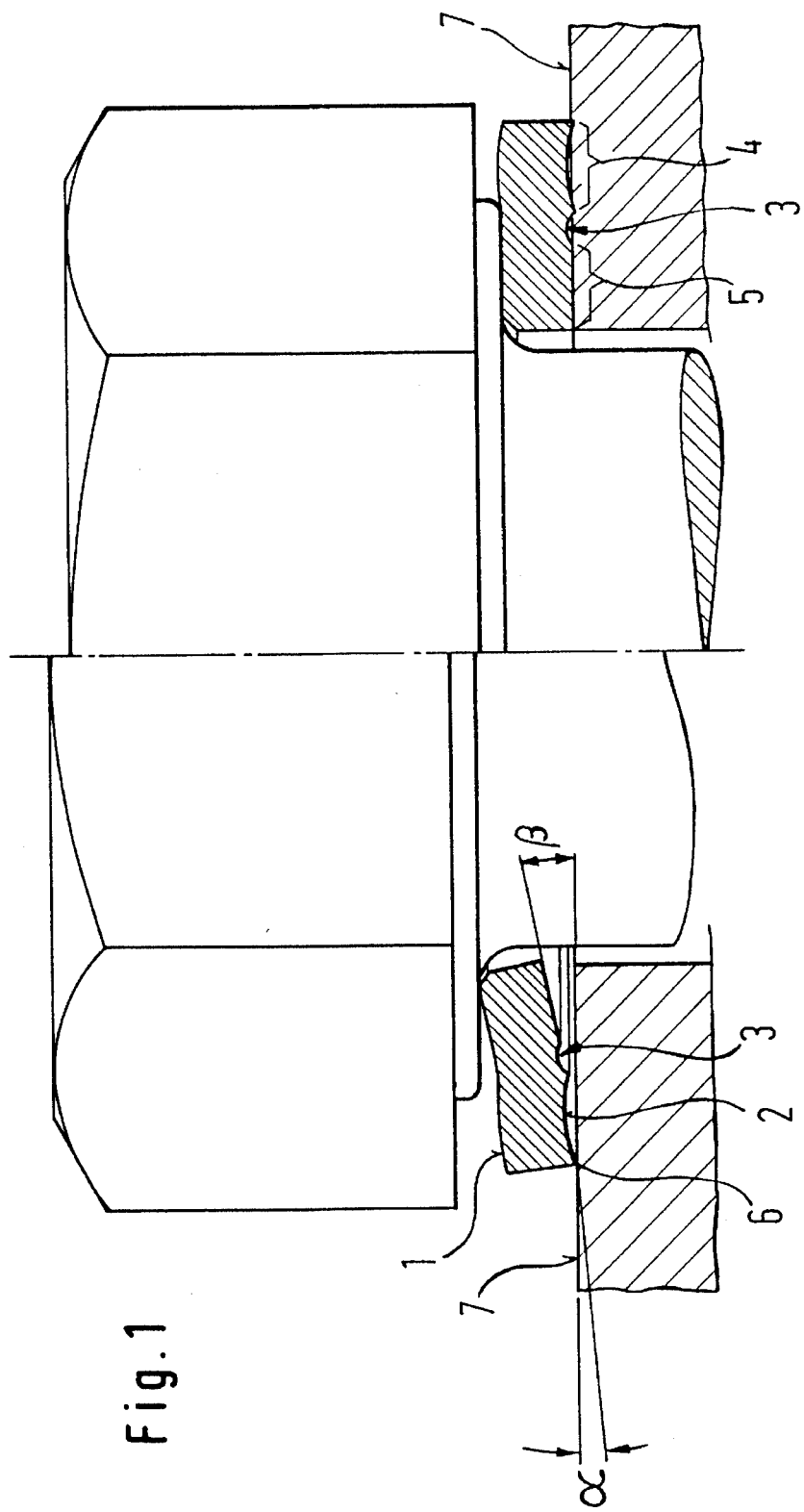
FIG. 1 shows a spring washer using the example of a screw fastener, wherein the left side of the Figure shows the spring washer in the unstressed state and the right shows the spring washer in the stressed state.

As shown in FIG. 1, the spring washer comprises an essentially ring-shaped washer body having a washer top side 1 and a washer under side 2. Moreover, the washer under side 2 is subdivided by a circular groove 3 into a outer ring surface 4 and a inner ring surface 5.

As shown on the left side of the FIG. 1, the spring washer is shaped such that it rests on a flat base 7 in an unstressed state with an outer edge 6 of its outer ring surface 4. Thereby, the arrangement is such that in an unstressed state the outer ring surface 4 forms an angle $\alpha$ with the flat base 7 and the inner ring surface 5 forms an angle $\beta$ with the flat base 7. According to the invention, the angles are chosen in such a way that the angle $\alpha$ as well as the angle $\beta$ are acute angles and the angle $\alpha$ always has a smaller value than the angle $\beta$. In the present exemplary embodiment, the angle $\alpha$ amounts to 5° and the angle $\beta$ to 12.5°.

A further significant feature of the represented exemplary embodiment of FIG. 1 is that the outer ring surface 4 is arched inwards, whereby ring-shaped cutting edges arise which dig into the surface of the base 7 as recognizable from the right side of FIG. 1.

In the represented exemplified embodiment of FIG. 1, the inner ring surface 5 is flat and the entire washer body is cambered in the outer ring region.

Figure 2:
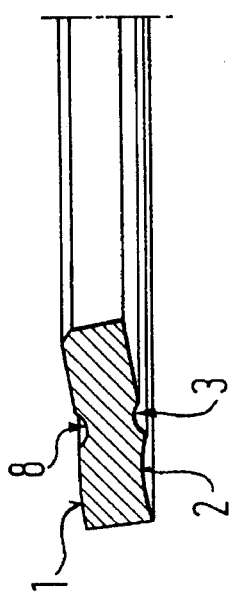
FIG. 2 shows a modified spring washer.

In the embodiment of FIG. 2, a groove 8 is provided in the washer top side and possesses an arcuate and/or semicircular cross section similar to the groove 3.

What is claimed is:

1. Spring washer for the securing of screws, nuts or the like with an essentially ring-shaped washer body of a determined thickness having a washer top side and a washer under side, the washer under side being subdivided into an outer ring surface and an inner ring surface, the washer in an unstressed state resting with the outer edge of the outer ring surface on a flat base and the outer ring surface and the inner ring surface forming each an acute angle with this base, characterized in that the washer under side (2) is subdivided by a circular groove (3) into the outer ring surface (4) and the inner ring surface (5) and the outer ring surface (4) is arched inwards and forms a smaller acute angle ($\alpha$) with the flat base (7) than the inner ring surface (5).

2. Washer according to claim 1, characterized in that the inner ring surface is flat.

3. Washer according to claim 1, characterized in that the inner ring surface is arched inwards.

4. Washer according to claim 1, characterized in that the acute angle ($\alpha$) between the outer ring surface (4) and the flat base (7) in the unstressed state is between 3° and 20°, preferably between 5° and 15°.

5. Washer according to claim 1, characterized in that the acute angle ($\beta$) between the inner ring surface (5) and the flat base (7) in the unstressed state is about twice as large as the acute angle ($\alpha$) between the outer ring surface (4) and the flat base (7).

6. Washer according to any one of claims 1 to 5, characterized in that the groove (3) in the washer under side is arcuate and/or semi-circular.

7. Washer according to claim 3, characterized in that the entire washer body is cambered in the inner ring region.

8. Washer according to claim 1, characterized in that the entire washer body is cambered in the outer ring region.

9. Washer according to claim 1, characterized in that the acute angle ($\beta$) between the inner ring surface (5) and the flat base (7) in the unstressed state is between 10° and 20°, preferably between 12° and 15°.

10. Washer according to claim 1, characterized in that the ratio of the outer ring surface (4) to the inner ring surface (5) is 3:1.

11. Washer according to claim 1, characterized in that the washer top side (1) has a groove in addition to the washer under side (2).

12. Washer according to claim 11, characterized in that the groove in the washer top side is arcuate and/or semicircular.

13. Washer according to claim 1, characterized in that the outer edge (6) of the outer ring surface (4) is sharp-edged.

14. Washer according to claim 1, characterized in that the washer top side (1) in the inner ring region has a profiling.

15. Washer according to claim 14, characterized in that the profiling is formed as a knurled head profiling, cross knurled head profiling or a corrugation.

16. Washer according to claim 1, characterized in that the washer top side (1) has a curvature.

17. Washer according to claim 16, characterized in that the curvature is concave.

* * * * *